United States Patent [19]
Feinleib

[11] Patent Number: 6,037,932
[45] Date of Patent: Mar. 14, 2000

[54] METHOD FOR SENDING COMPUTER NETWORK DATA AS PART OF VERTICAL BLANKING INTERVAL

[75] Inventor: David Feinleib, Redmond, Wash.

[73] Assignee: Microsoft Corporation, Redmond, Wash.

[21] Appl. No.: 08/726,529

[22] Filed: Oct. 7, 1996

Related U.S. Application Data

[60] Provisional application No. 60/018,526, May 28, 1996.

[51] Int. Cl.⁷ ..................................................... H04N 7/173
[52] U.S. Cl. ...................... 345/327; 348/478; 395/200.49
[58] Field of Search ..................................... 348/478, 476, 348/7, 12, 13, 10; 345/327, 328; 395/200.47, 200.48, 200.49

[56] References Cited

U.S. PATENT DOCUMENTS

| | | | |
|---|---|---|---|
| 5,541,662 | 7/1996 | Adams et al. | 348/460 |
| 5,552,833 | 9/1996 | Henmi et al. | 348/478 |
| 5,594,228 | 1/1997 | Hershey et al. | 370/471 |
| 5,604,542 | 2/1997 | Dedrick | 348/478 |
| 5,689,799 | 11/1997 | Dougherty et al. | 455/2 |
| 5,694,163 | 12/1997 | Harrison | 348/13 |
| 5,774,664 | 6/1998 | Hidary | 348/12 |
| 5,774,666 | 6/1998 | Portuesi | 395/200.48 |
| 5,818,935 | 10/1998 | Mau | 348/467 |

FOREIGN PATENT DOCUMENTS

| | | |
|---|---|---|
| 0 723 369 A1 | 1/1995 | European Pat. Off. . |
| 0 757 485 A2 | 7/1996 | European Pat. Off. . |

*Primary Examiner*—Victor R. Kostak
*Attorney, Agent, or Firm*—Lee & Hayes, PLLC

[57] ABSTRACT

A method for encoding a network data packet, such as an Internet Protocol (IP) data packet, into a format for transmission as part of the Vertical Blanking Interval (VBI) of a broadcast video signal is described. The method includes receiving a network data packet from a data network. The network data packet has a data block and header information. The network data packet is then encoded into a variable-length data group packet having a variable-length data block and header information. The network data packet is inserted in its entirety into the data block of the data group packet. In one implementation, the header information for the data group packet includes a 2-byte type header indicating a type of network data contained in the data block of the data group packet and a 6-byte reserved space header that is reserved for future definition by the developer. One potential use of the reserved space header is for a MAC address. In a second implementation, the header information for the data group packet consists of a conventional NABTS-defined record header. The variable-length data group packet is then encoded into one or more fixed-length VBI-compatible packets. Each VBI-compatible packet has the potential to store up to 28 bytes of data. The data group packet is partitioned and placed into the data blocks.

24 Claims, 6 Drawing Sheets

METHOD FOR SENDING COMPUTER NETWORK DATA AS PART OF VERTICAL BLANKING INTERVAL

RELATED APPLICATION

This application claims the benefit of U.S. Provisional Application No. 60/018,526, filed May 28, 1996.

TECHNICAL FIELD

This invention relates to methods for sending computer network data, and particularly Internet Protocol (IP) data, as part of the Vertical Blanking Interval of a broadcast video signal (e.g., a conventional television signal).

BACKGROUND OF THE INVENTION

Conventional broadcast television signals are transmitted in a data format that is used to construct individual television frames. Each frame contains video image data (i.e., pixel data) used to create images on the television screen and control information used to control the presentation of the image, such as synchronization and timing information. The Video Blanking Interval (VBI) is the upper 21 lines of a typical television frame. These VBI lines are not displayed on the television, but are instead used to carry the television control information. Up to ten VBI lines can be used for transmission of data separate from and in addition to the television image control information. Additionally, line 21 of the VBI is used for transmission of closed captioning information.

A standard format for sending data as part of the VBI lines is specified by the Electronic Industries Association document EIA-516 (May, 1988): "Joint EIA/CVCC Recommended Practice for Teletext: North American Basic Teletext Specification (NABTS)." The NABTS specification defines a format for dividing lengthy streams of data into fixed-length data packets. It is these data packets that are encoded into the VBI and transmitted over the broadcast network.

Figure 1:
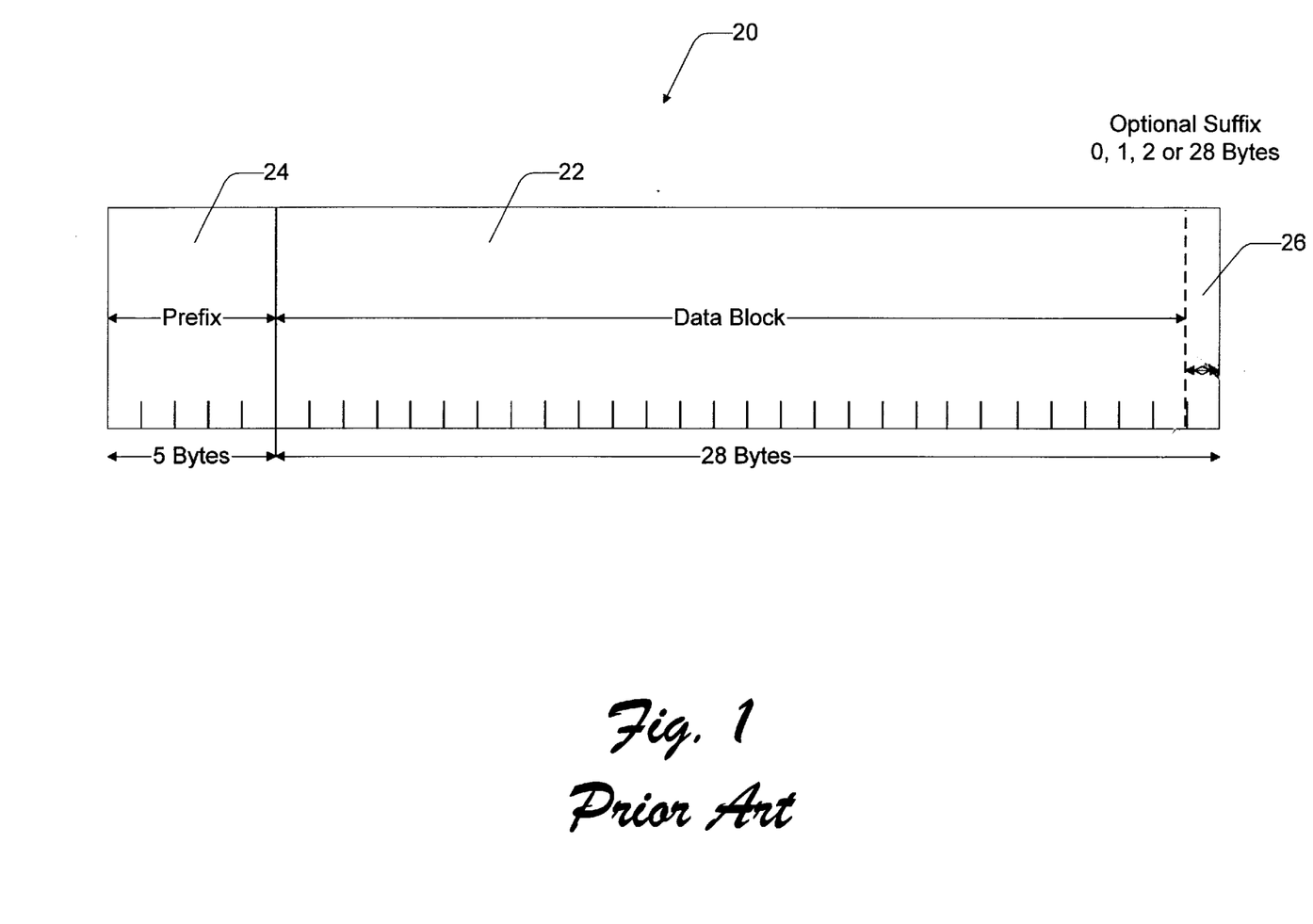
FIG. 1 is a diagrammatic illustration of a prior art packet structure constructed according to the North American Basic Teletext Specification (NABTS) standard.

FIG. 1 shows a VBI-compatible data packet 20 consisting of 33 eight-bit bytes. The VBI data packet 20 comprises a data block 22, which may be up to 28 bytes in length, and a five-byte prefix or header 24. The data block 22 varies in length depending upon the size of an optional suffix or trailer 26, which follows the data block. The trailer 26 can be 0, 1, 2, or 28 bytes in length. Accordingly, the data block can be 0, 26, 27, or 28 bytes in length. Different encoders have different modes which dictate the length of the trailer 26 and hence, the length of the actual data stored in the data block 22. The optional trailer 26 provides room for specifying error detection or error detection and correction data to be used by receivers. The five-byte header 24 consists of three packet address bytes, one continuity index byte, and one packet structure byte.

Present VBI encoding and decoding technology provides a convenient and reliable method for sending data as part of the VBI of a television signal. Today, the VBI is used for transmission of a number of forms of data, including stock quotes and weather data, for example. For a number of years, it was uncommon for users to view television on their computers. More recently, though, it has become more common for users to view television signals on their computers. An increasing number of viewer/users is expected in the future. With such convergence of television viewing and computer use, it is expected that viewers will want to be able to make use of the data transmitted in the VBI easily, especially on their computers. Unfortunately, most computer applications today are not configured to be compatible with the VBI data. To receive the VBI data, application developers must specialize their products. This is particularly the case for developers building applications for a Windows®-based operating system manufactured and sold by Microsoft, as such applications must be configured to call specialized functions that are not a standard part of the Windows® operating system.

It would be beneficial to provide a more global approach to transmitting VBI data so that it can be easily used in computer applications without calling specialized functions.

In the network environment, computer applications use standard sets of Application Programming Interfaces (APIs) to transmit and receive data over networks and over the Internet. For example, applications designed to run on Windows®-based operating systems employ a standard set of APIs that are defined in the Windows Sockets Specification, a well known specification. These APIs have been defined by industry committees and are widely in use. The Sockets APIs provide a network independent way to send and receive data, no matter what the underlying computer network (e.g., Ethernet, asynchronous transfer mode (ATM), satellite, etc.). Computer applications do not need to be specially written to receive data from a particular network. Instead, a developer writes code for an application that interfaces to the Windows(® Sockets API, enabling the application to send and receive data over a number of different networks supported by the computer's hardware.

One common and widely used type of network data is called Internet Protocol (IP) data. IP data defines a standard format for carrying data over essentially any underlying network, including the Ethernet and the Internet. The IP standard defines a packet used to encapsulate the data, and IP data is always encapsulated in this packet, regardless of the transmission network.

The inventor has conceived of a technique to repackage network data, such as IP data, into a VBI-compatible format which can be transmitted as part of a traditional broadcast television signal. At the receiver, the network data is extracted from the VBI signal and passed to the computer application through a standard set of existing APIs, rather than through proprietary or non-standard functions known only to single monolithic client applications.

SUMMARY OF THE INVENTION

One aspect of this invention concerns a method for encoding network data, such as Internet Protocol (IP) data, into a format for transmission as part of the Vertical Blanking Interval (VBI) of a broadcast video signal. This method includes configuring a network data packet having a data block and header information. As an example, an IP packet has a variable length data block and fixed length header information in the form of an IP header and a UDP (User Datagram Protocol) header.

The network data packet is encoded into a variable-length data group packet, which is preferably an NABTS-compatible data group packet. The data group packet has a variable-length data block and header information. The network data packet is inserted into the data block of the data group packet. In one implementation, the header information for the data group packet includes a 2-byte type header which identifies a type of network data contained in the data block of the data group packet and a 6-byte reserved space header which is reserved for future definition by the developer. One potential use of the reserved space header is for a Media Access Control (MAC) address, typically synonymous with physical address. The MAC address is normally used in reference to the low level hardware protocols used to access a particular network. In a second implementation, the header information for the data group packet consists of a conventional five-byte NABTS-compatible record header.

Once the variable-length data group packet is constructed, it is encoded into one or more fixed-length VBI-compatible packets. These VBI-compatible packets are preferably the 33-byte packets defined at the network layer of the NABTS standard. Each VBI-compatible packet has the potential to store up to 28 bytes of data. The data group packet is partitioned and placed into the data blocks of the VBI-compatible packets.

Using this method, data received over a data network (i.e., Ethernet or Internet) is repackaged for broadcast as part of the VBI of a television signal. The packaged network data remains independent of the underlying network and can be easily extracted at the receiver for use by computer applications.

According to another aspect, a method for decoding computer network data received as part of the VBI is described. The multiple fixed-length VBI-compatible packets are received at individual user-based receiving units (i.e., television, set-top box, computer). The variable-length data group packet are reconstructed by stripping the header from the fixed-length VBI-compatible packets and combining the data payload of the VBI-compatible packets. The reconstructed data group packet has a header describing the type of network data and a data block containing the network data. The receiving unit reads the header and extracts the network data from the data block of the data group packet.

In this manner, network data is transmitted over the VBI without losing its known format. A computer application can use standard APIS, such as those prescribed by the Windows Sockets Specification, to use the network data. By transmitting encapsulated network data in a VBI-compatible packet, content distributors will be able to support a wide new range of applications. Applications developers will find it easy to make use of the network data because it is available through standard interfaces with which they are already familiar.

DETAILED DESCRIPTION OF THE PREFERRED EMBODIMENT

The following discussion assumes that the reader is familiar with the standard format for sending data as part of the VBI lines as specified in the NABTS specification (Electronic Industries Association document EIA-516 (May, 1988): "Joint EIA/CVCC Recommended Practice for Teletext: North American Basic Teletext Specification (NABTS)"). The NABTS specification is hereby incorporated by reference.

Figure 2:
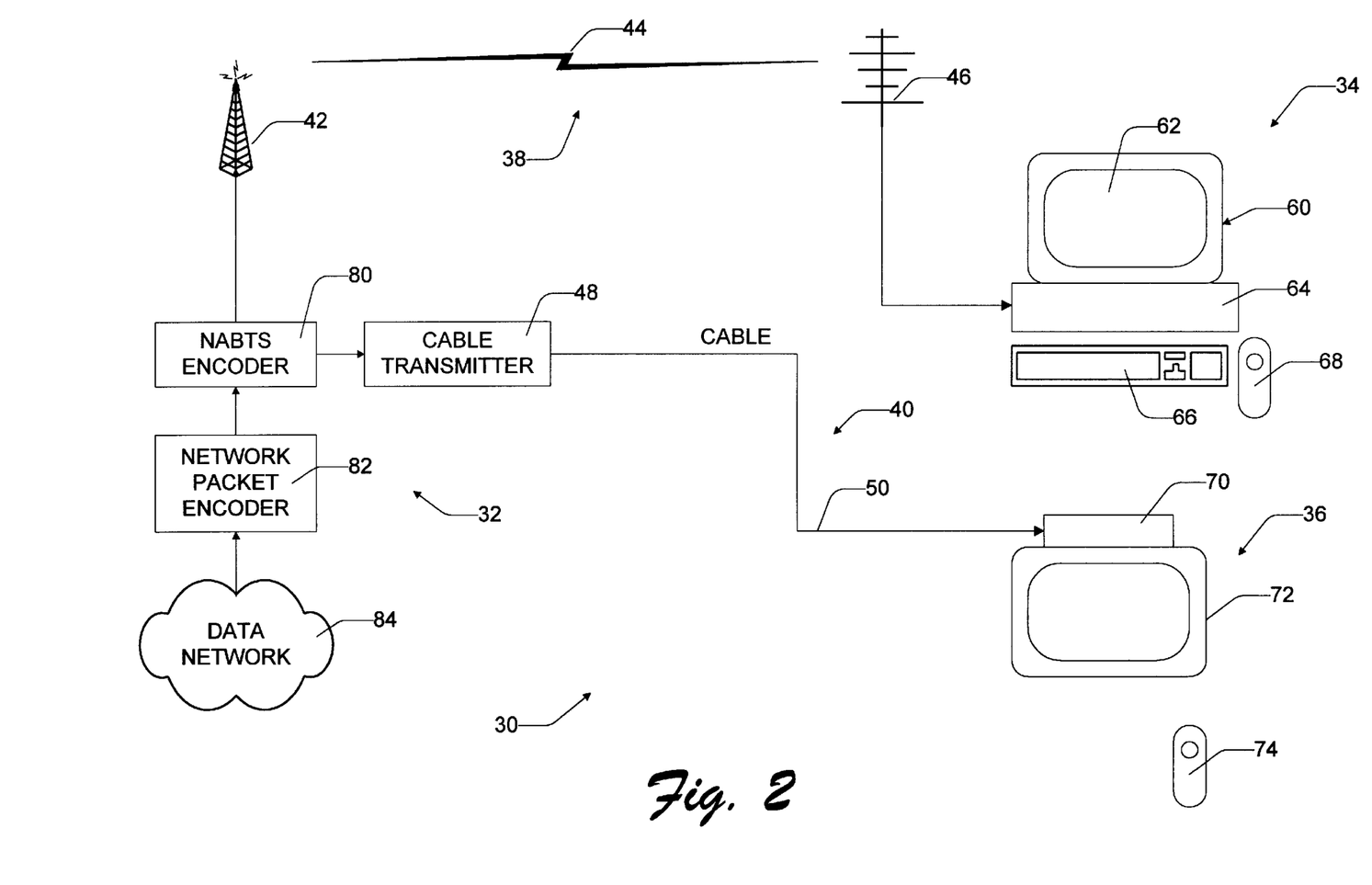
FIG. 2 is a diagrammatic illustration of a broadcast transmission system.

FIG. 2 shows a broadcast transmission system 30 for delivering video signals from a content provider 32 (e.g., cable headend, television broadcast station, etc.) to multiple receivers 34, 36. For purpose of this discussion, the broadcast transmission system 30 is described in the context of a traditional broadcast television system which transmits television signals to many residences.

The video signals, such as traditional television signals, are distributed over a broadcast distribution network. Two example networks are shown in FIG. 2: a traditional analog VHF or UHF broadcast network 38 and a cable network 40. The VHF/UHF broadcast network 38 includes a wireless transmitter 42, in the form of a television tower located at the content provider 32, which transmits the television signals 44. A receiver 46, in the form of an antenna located individual residences, receives the television signals 44.

The cable network 40 includes a cable transmitter 48 located at the content provider 32. The cable transmitter 48 sends signals over a cable distribution structure 50 (e.g., fiber optic cable, coaxial cable, twisted pair, etc.) to a cable receiver 50 located at the individual residences. In FIG. 2, the receiver 52 is depicted as a set-top box.

It is noted that other network implementations may be used, such as satellite communications, RF communication, or a combination of wireless and wire-based technologies.

In the illustrated implementation, two different kinds of display units are shown for example purposes. At residence 34, the display unit is embodied as a broadcast enabled personal computer 60, or simply "broadcast PC." The broadcast PC 60 has a large VGA monitor 62, a processing unit 64, and input devices in the form of remote keyboard 66 and remote control handset 68. The remote keyboard 66 and handset 68 are remotely coupled to the processing unit 64 via a wireless data link, such as infrared (IR) or radio (RF). Other types of input devices (e.g., mouse, track ball, stylus, etc.) can be used instead of, or in addition to, the keyboard and handset.

At residence 36, the display unit is embodied as a set-top box 70 coupled to a conventional television 72. A remote control handset 74 is used to remotely control the set-top box and television via a wireless data link. In another embodiment, the functionality in the set-top box 70 can be incorporated into the television 72.

Content provider 32 is configured to originate the broadcast video signals as separate frames containing image data and VBI data. The content provider 32 has an NABTS encoder 80 which encodes VBI data in the conventional 33-byte VBI-compatible data packets described in the Background of the Invention section with respect to FIG. 1.

The content provider 32 also includes a network packet encoder 82 which is coupled to a data network 84, such as an Ethernet or the Internet. The network packet encoder 82 receives a network data packet from the network 84 and converts it into a form used by the NABTS encoder 80. The network packet encoder 82 can be implemented in software, hardware, or a combination. As one example, the network packet encoder 82 can be implemented as a router.

Figure 3:
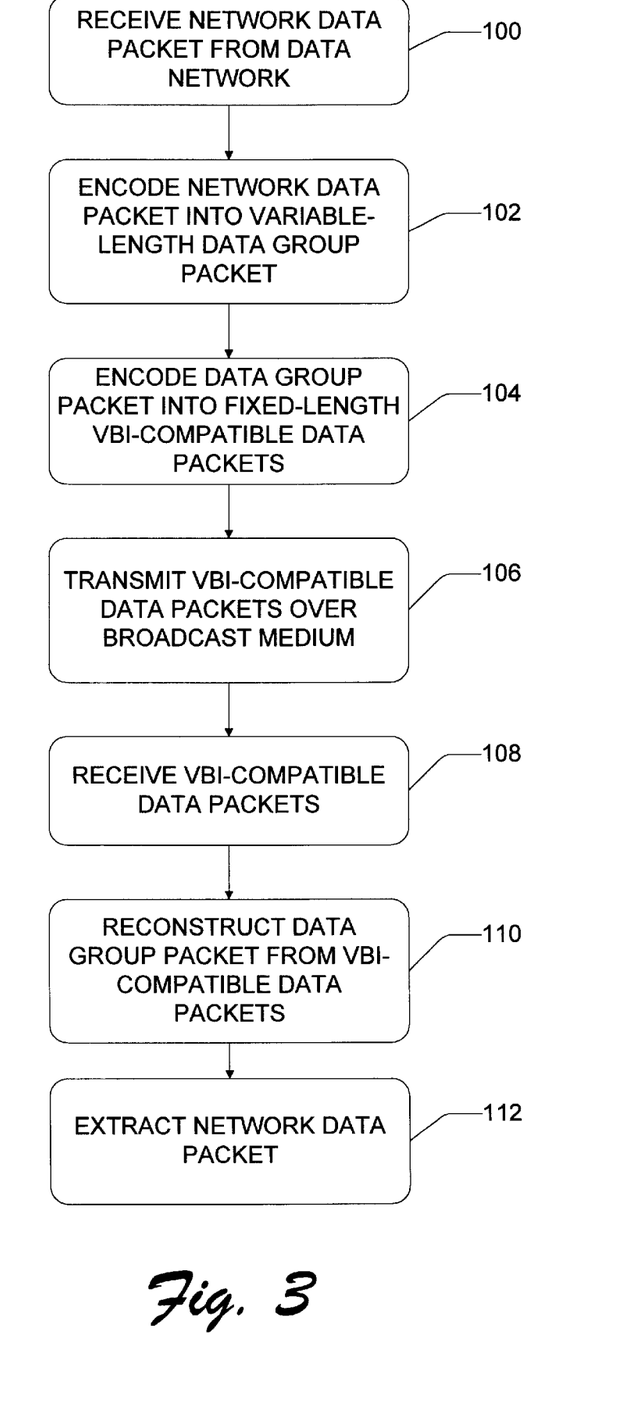
FIG. 3 is a flow diagram of a method for sending network data over the broadcast transmission system.

FIG. 3 shows a method for operating the broadcast transmission system 30 to carry network data during the VBI interval. This method will be described with reference to FIGS. 2 and 4–6.

Figure 4:
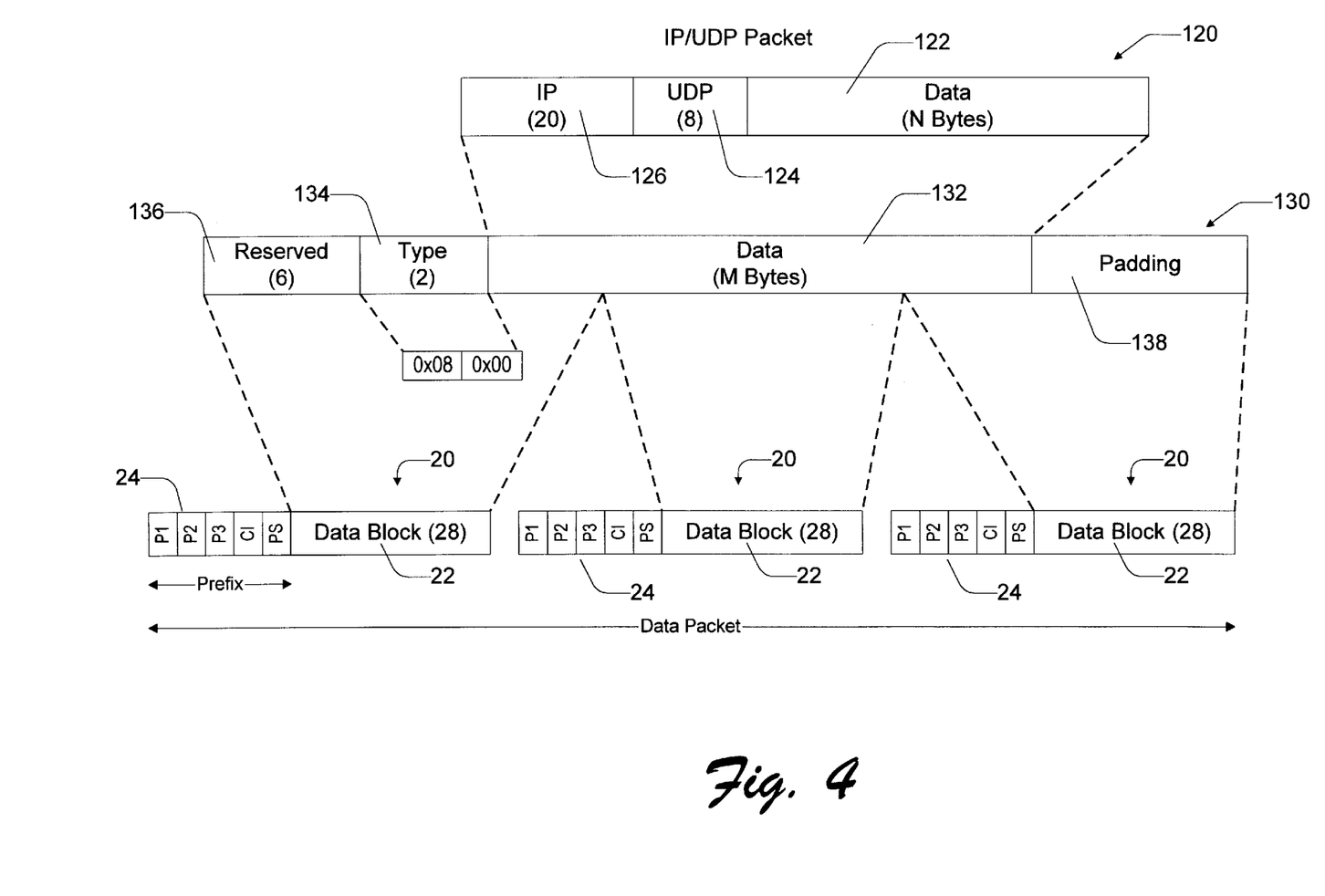
FIG. 4 is a diagrammatic illustration of a data transmission structure used to carry network data in a VBI-compatible packet according to a first implementation.
Figure 5:
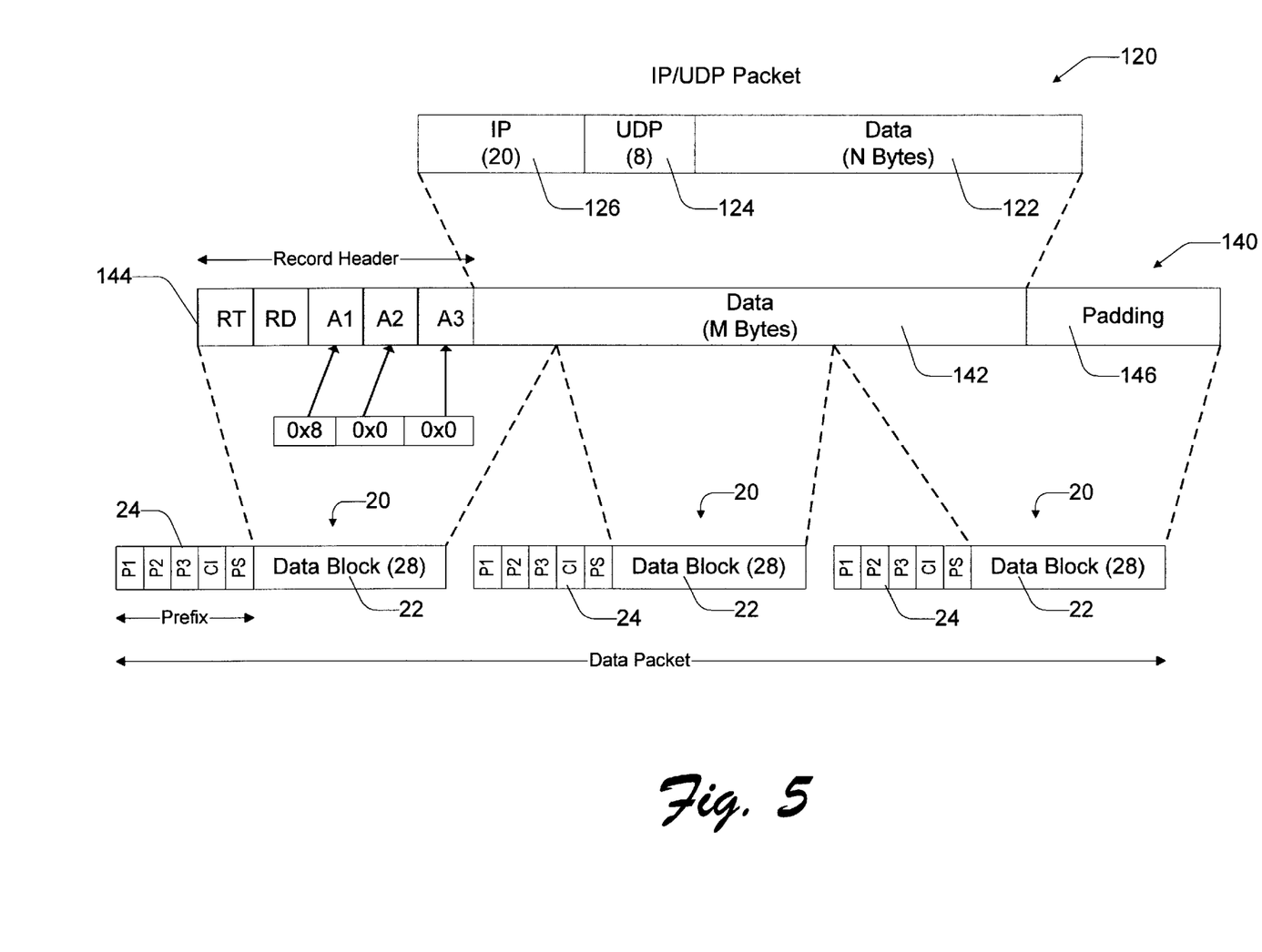
FIG. 5 is a diagrammatic illustration of a data transmission structure used to carry network data in a VBI-compatible packet according to a second implementation.

At step 100, the network packet encoder 80 receives a network data packet from the data network 84. As an example, the network data packet is in the form of an Internet Protocol (IP) packet. FIGS. 4 and 5 show an IP packet 120. It has a variable-length (N-byte) data payload 122, a fixed-length (A-byte) transport protocol header 124, and a fixed-length (B-byte) IP header 126. The data payload 122 contains the actual network data. The transport protocol header 124 designates the transport layer protocols for the data network. Examples of the transport protocol include Transmission Control Protocol (TCP) and User Datagram Protocol (UDP). In FIGS. 4 and 5, the IP packet 120 has a UDP header 124 that is eight bytes in length.

The IP header 126 provides the addressing information necessary to deliver the data from source to destination. In this example, it is 20 bytes in length.

At step 102 in FIG. 3, the network packet encoder 82 encodes the network data packet into a variable length data group packet. FIGS. 4 and 5 show two different implementations of step 102 for the example IP packet 120. In FIG. 4, the IP packet 120 is encoded into a variable-length data group packet 130. In this implementation, the data group packet 130 has a variable-length (M-byte) data block or data payload 132, a fixed-length (C-byte) type header 134 and a fixed-length (D-byte) reserved space header 136. The IP packet 120 is inserted in its entirety (including both headers) into the data payload 132.

The fixed-length type header 134 of the data group packet 130 indicates the type of data contained in the following data payload 132. In this example, the fixed-length type header 134 is a two-byte header that is set to 0x08, 0x00 to specify that IP data follows. Other data types besides IP data can be specified. For example, to specify that an ARP packet follows, the type header might contain 0x08, 0x06.

The reserved space header 136 of the data group packet 130 is specially reserved for future usage. In this implementation, the reserved space header 136 is a six-byte header particularly suited for storage of the MAC address. As noted earlier, the MAC address is used for storing hardware specific information, in particular a physical hardware address. (See, e.g., Comer, Douglas E., Internetworking with TCP/IP Volume 1, Third Edition, Prentice Hall: Upper Saddle River, N.J., 1995.) Currently, this space is not used because bandwidth is relatively low and therefore filtering does not need to be performed at a hardware level. All filtering is done in software. When the reserved space goes unused, the six bytes are each set to 0x0.

The data group packet 130 also has optional padding bits 138 to permit encoding of the last portion of the data block 132 into the fixed-size VBI-compatible packets, as will be described below in more detail.

In the FIG. 5 implementation, the IP packet 120 is encoded into a slightly different configuration of a variable-length data group packet 140. Here, the data group packet 140 has a variable-length (M-byte) data block or data payload 142 and a fixed-length record header 144. The IP packet 120 is inserted in its entirety (including both headers) into the data payload 142 of the data group packet 140. Padding bits 146 can be optionally used to ensure conformance to the VBI-compatible data packet format, as described below.

The record header 144 enables conformation to the record layer defined in the NABTS specification. The record header specification was defined when encoders were more primitive. This layer is now infrequently, if ever used, in the industry as the Bundle Sack Mode (which does not interpret the record format) is used almost universally today. To conform to this mode, the network packet encoder 82 attaches a predefined five-byte record header 144 to the data payload 142. Because this mode is not expected to be used for transmission at high bandwidth, no space is reserved for the MAC address as is done in the FIG. 4 implementation.

Each byte of the record header 144 contains four bits (a nibble) b2, b4, b6, and b8, and the alternating odd four bits b1, b3, b5, b7 are used as Hamming coded protection of the four even bits. The first two bytes designate the record type (RT) and the record header designator (RD). These types are specified chapter 5 of the NABTS specification. The RT and RD bytes are followed by three bytes of address space A1, A2, and A3 which specify the format of the data carried in the data payload 142. For IP data, the three bytes are specified as A1=0x8, A2=0x0, and A3=0x0. Other fields of the record header that are prescribed in the NABTS specification—the record address extension, record link, classification sequence, and header extension field—are specified as absent.

At step 104 of FIG. 3, the NABTS encoder 80 encodes the data group packet 130, 140 output from the network packet encoder 82 into one or more fixed-length (33-byte) VBI-compatible data packets 20. As described in the Background of the Invention, each VBI-compatible data packet 20 has a data block 22 and a five-byte header 24. More particularly, the data group packet 130, 140 is partitioned into 26-, 27-, or 28-byte segments and inserted into the data block 22. The padding bits 138, 146 ensure that the data group packet 130, 140 fits evenly into the 28-byte data block 22. The header 24 consists of three packet address bytes P1, P2, P3, one continuity index byte CI, and one packet structure byte PS.

With respect to step 104 of the FIG. 3 method, the two different data group packets 130, 140 are treated as NABTS-compatible, variable-length data group packet as prescribed by chapter 4 the NABTS specification. These data group packets are segmented into the VBI-compatible data packets 20 according to well-known, conventional techniques defined in the NABTS specification.

It is noted that the network packet encoder 82 and NABTS encoder 80 can be implemented in hardware, software, or a combination hardware/software. In hardware, the network data packet is initially placed in a register. The appropriate headers are added to form the data group packet, which is then stored in another register. The data group packet can be passed to a shift register in the NABTS encoder 80 where it is shifted out 33-bytes at a time to form the VBI-compatible data packets 20. In a software implementation, the network data packet is cached in memory, where the appropriate headers are later added. The software then segments the information into the VBI-compatible data packets.

At step 106 of FIG. 3, the VBI-compatible data packets 20 are transferred to the appropriate transmitter (e.g., tower transmitter 42 or cable transmitter 48) and broadcast over the broadcast medium as part of VBI within the analog television signal. The individual residences 34, 36 are equipped with a receiving unit (e.g., antenna 46, set-top box 70, etc.) to receive the VBI-compatible packets 20 from the broadcast distribution medium (step 108 of FIG. 3). The 33-byte data packets are transferred to a decoding unit.

Figure 6:
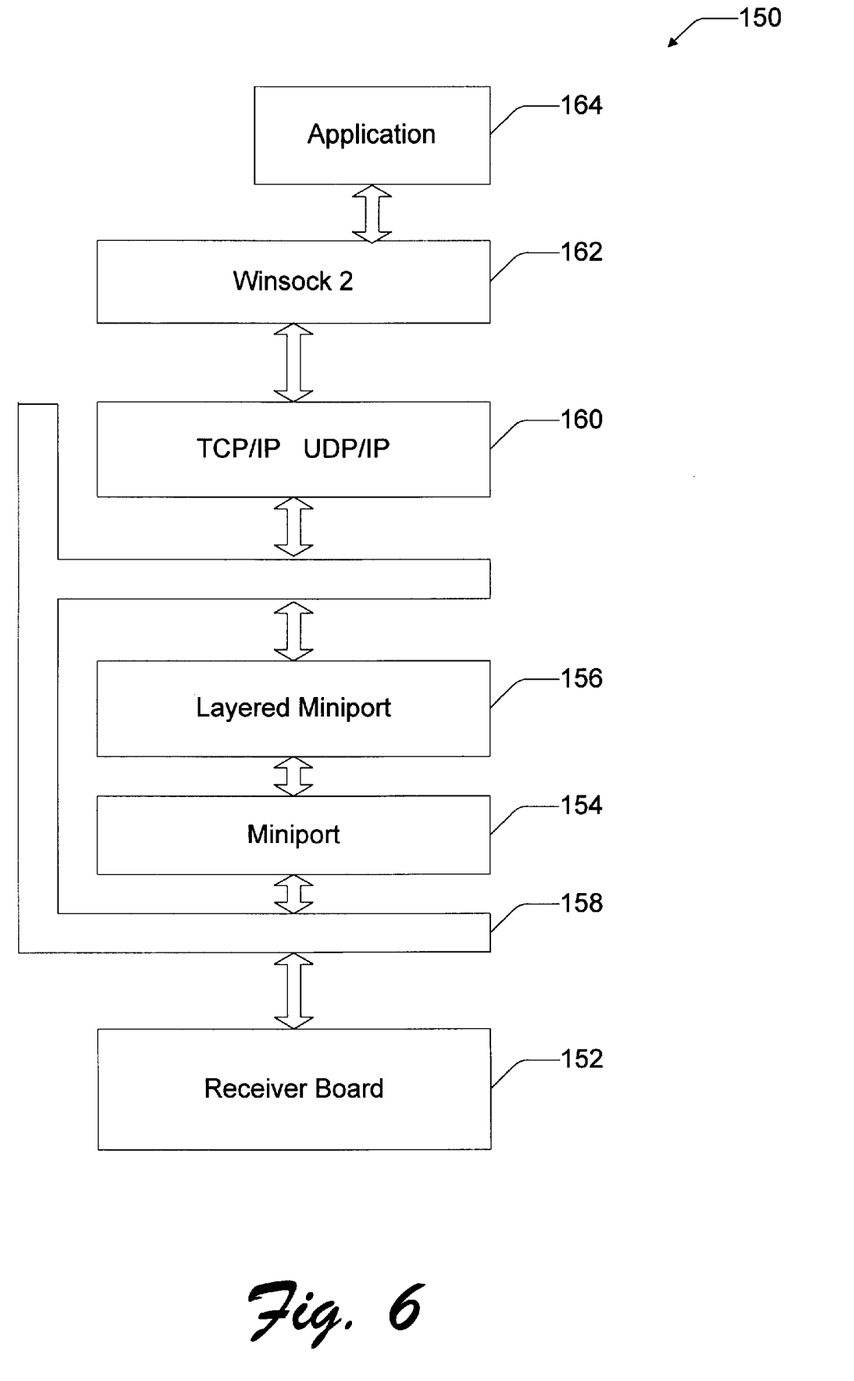
FIG. 6 is a block diagram of a receiving and decoding unit.

FIG. 6 shows a receiving and decoding unit 150 in more detail. It includes a receiver board 152 which receives the VBI-compatible packets 20 of the analog television signal. The receiver board 152 can be configured as part of the tuner which is capable of tuning to a specified channel. In one implementation, the receiver board 152 is configured to perform Forward Error Correction (FEC) and data packet re-assembly, as well as other functions specified in Chapter 3 of the NABTS specification.

A miniport driver 154 and layered miniport driver 156 are coupled to receive the VBI-compatible packets 20 from the receiver board 152. In the illustrated example, the drivers are VBI network interface card (NIC) drivers that comply with the Network Device Interface Specification (NDIS) 4.0, as represented by interface layer 158. In one implementation, the layered miniport driver 156 is a layered 802.3 miniport driver. These drivers support the VBI extensions defined in the NDIS document. The VBI NIC drivers 154, 156 perform the following three functions:

1. Connection management via the NDIS library using special VBI Object IDs and a VBI media type;
2. Data I/O via the NDIS library (NDIS.SYS); and
3. Support for UDP/IP multicast packets.

Additionally, if the hardware level receiver board 152 does not support the functionality defined in the NABTS specification, the device drivers may also perform the forward error correction and data packet re-assembly as specified in NABTS specification at Chapter 3.

Packet re-assembly, whether performed in hardware at receiver board 152 or software at the miniport drivers 154, 156, consists of first reconstructing the data group packet 130, 140 from the fixed-length VBI-compatible packets 20 (step 110 of FIG. 3). After the data group packet is recovered, the network data packet (e.g., IP packet 120) is extracted from the data payload of the data group packet (step 112 of FIG. 3). If the data group packet is in the format of the FIG. 4 implementation, the type header is initially read to identify what type of network data is contained in the data payload before proceeding to the data extraction step.

Once the network data packet is extracted, it is ready for use by the application. In the FIG. 6 embodiment, the network packet is an IP packet which is passed to the network protocol software interface. Typically, this software interface supports both TCP (Transmission Control Protocol, a reliable two way transmission method) and UDP (User Datagram Protocol, a unidirectional, nonguaranteed method of sending data). In the case of IP data transmitted in the VBI, the client accepts IP data using the UDP software interface 160, which performs some rudimentary error checking (e.g., CRC) and filtering. At this point, the IP packet is in order to be handled by the Winsock layer 162, a software implemented interface which complies with the Windows Sockets Specification. The Windows Sockets Specification defines a well known standard set of APIs that provide a network independent way to send and receive data. An application 164 uses the IP data packets through various API calls orchestrated through the Winsock layer 162.

This invention is beneficial in that it prescribes a technique for transmitting network data over the VBI without losing its known format. A computer application at the recipient can use standard APIs, such as those prescribed by the Windows Sockets Specification, to use the network data.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A method for encoding Internet Protocol (IP) data into a format for transmission as part of Vertical Blanking Interval (VBI) of a broadcast video signal, comprising the following steps:

receiving an IP packet having an IP data block and header information;

encoding the IP packet into a variable-length data group packet having a data block and header information so that the data block of the data group packet comprises the IP packet, the header information comprising a 6-byte first header and a 2-byte second header; and encoding the variable-length data group packet into one or more fixed-length VBI-compatible packets, each VBI-compatible packet having header information and a data block comprising at least a portion of the data group packet.

2. A method as recited in claim 1, further comprising the step of transmitting the fixed-length VBI-compatible packets.

3. The variable-length data group packet, embodied on a storage medium, that is constructed according to the steps in the method as recited in claim 1.

4. A computer programmed to perform the steps of the method as recited in claim 1.

5. A computer-readable memory which directs a computer to perform the steps of the method as recited in claim 1.

6. A method for encoding Internet Protocol (IP) data for broadcast transmission, comprising the following steps:

receiving an IP packet having an IP data block and header information; and inserting the IP packet as a data payload of a variable-length data group packet having a 6-byte first header and a 2-byte second header.

7. The variable-length data group packet, embodied on a storage medium, that is constructed according to the steps in the method as recited in claim 6.

8. A computer programmed to perform the steps of the method as recited in claim 6.

9. A computer-readable memory which directs a computer to perform the steps of the method as recited in claim 6.

10. A method for encoding Internet Protocol (IP) data for broadcast transmission, comprising the following steps:

receiving an IP packet having an N-byte IP data block, an A-byte transport protocol header, and a B-byte IP header;

constructing a variable-length data group packet having an M-byte data payload, a C-byte data type header, and a D-byte reserved space header;

inserting the entire N+A+B-byte IP packet into the M-byte data payload of the data group packet; and encoding the variable-length data group packet into one or more fixed-length VBI-compatible packets, each VBI-compatible packet having header information and a data block comprising at least a portion of the data group packet.

11. A method as recited in claim 10, wherein the C-byte data type header comprises 2 bytes and the D-byte reserved space header comprises 6 bytes.

12. A method as recited in claim 10, wherein the A-byte transport protocol header comprises 8 bytes and the B-byte IP header comprises 20 bytes.

13. A method as recited in claim 10, wherein the variable-length data group packet is also constructed with a trailer of one or more padding bytes.

14. The variable-length data group packet, embodied on a storage medium, that is constructed according to the steps in the method as recited in claim 10.

15. A computer programmed to perform the steps of the method as recited in claim 10.

16. A computer-readable memory which directs a computer to perform the steps of the method as recited in claim 10.

17. A method for encoding a computer network data packet for transmission as part of a Vertical Blanking Interval (VBI) of a broadcast video signal, comprising the following steps:

adding a 6-byte first header and a 2-byte second header to the network data packet to form a data group packet;

encoding the data group packet into one or more fixed-length VBI-compatible packets.

18. The VBI-compatible packets, embodied on a storage medium, that are constructed according to the steps in the method as recited in claim 17.

19. A computer programmed to perform the steps of the method as recited in claim 17.

20. A computer-readable memory which directs a computer to perform the steps of the method as recited in claim 17.

21. A computer programmed to perform the following steps:

receiving multiple fixed-length VBI-compatible packets;

reconstructing a variable-length data group packet from the fixed-length VBI-compatible packets, the data group packet having a header and a variable-length data block containing the network data;

reading the header of the data group packet to identify a type of data contained in the data block of the data group packet; and extracting the network data from the data block of the data group packet.

22. A broadcast transmission system for distributing video signals from a distributor to a receiver, comprising:

an encoding unit at the distributor to encode a computer network data packet into a Vertical Blanking Interval (VBI) compatible packet, the computer network data packet having an N-byte data block, an A-byte transport protocol header, and a B-byte IP header, the encoding unit constructing a variable-length data group packet having an M-byte data payload, a C-byte data type header, and a D-byte reserved space header and inserting the entire N+A+B-byte IP packet into the M-byte data payload of the data group packet, the encoding unit further encoding the variable-length data group packet into one or more fixed-length VBI-compatible packets, each VBI-compatible packet having header information and a data block comprising at least a portion of the data group packet;

a transmission unit coupled to receive the VBI-compatible packets from the encoding unit, the transmission unit transmitting the VBI-compatible packets over a distribution medium;

a receiving unit at the receiver to receive the VBI-compatible packets from the distribution medium; and a decoding unit coupled to the receiving unit to reconstruct the variable-length data group packet from the fixed-length VBI-compatible packets and extract the network data packet from the data group packet.

23. An encoding unit for encoding a computer network data packet for transmission as part of a Vertical Blanking Interval (VBI) of a broadcast video signal, comprising:

means for adding a 6-byte first header and a 2-byte second header to the network data packet to form a data group packet; and means for encoding the data group packet into one or more fixed-length VBI-compatible packets.

24. A computer-readable medium having a network packet structure that can be encoded into fixed-length data blocks for transmission as part of a Vertical Blanking Interval (VBI) of a broadcast video signal, the network packet structure comprising:

a variable-length data block encapsulating network data and header information for the network data;

a two-byte first header to the data block, the first header indicating a type of network data contained in the data block; and a six-byte second header to the data block, the second header comprising reserved space for subsequent definition by a user.

* * * * *